(12) United States Patent
Zheng et al.

(10) Patent No.: US 8,098,918 B2
(45) Date of Patent: Jan. 17, 2012

(54) METHOD AND SYSTEM FOR MEASURING LEFT VENTRICLE VOLUME

(75) Inventors: Yefeng Zheng, Dayton, NJ (US); Bogdan Georgescu, Plainsboro, NJ (US); Michael Scheuering, Nürnberg (DE); Dorin Comaniciu, Princeton Junction, NJ (US)

(73) Assignee: Siemens Corporation, Iselin, NJ (US)

( * ) Notice: Subject to any disclaimer, the term of this patent is extended or adjusted under 35 U.S.C. 154(b) by 819 days.

(21) Appl. No.: 12/228,911

(22) Filed: Aug. 18, 2008

(65) Prior Publication Data

US 2009/0080745 A1    Mar. 26, 2009

Related U.S. Application Data

(60) Provisional application No. 60/974,139, filed on Sep. 21, 2007.

(51) Int. Cl.
*G06K 9/00* (2006.01)

(52) U.S. Cl. ....................................................... 382/131

(58) Field of Classification Search .......... 382/128–132; 378/4, 19, 62, 69, 95
See application file for complete search history.

(56) References Cited

U.S. PATENT DOCUMENTS

| 5,056,526 | A | 10/1991 | Khalil |
| 6,334,849 | B1 | 1/2002 | Sunagawa |
| 7,211,045 | B2 | 5/2007 | Dala-Krishna et al. |
| 7,286,875 | B1 | 10/2007 | Park et al. |
| 2008/0181479 | A1 * | 7/2008 | Yang et al. ................... 382/131 |

* cited by examiner

*Primary Examiner* — Irakli Kiknadze

(57) ABSTRACT

A method and system for measuring the volume of the left ventricle (LV) in a 3D medical image, such as a CT, volume is disclosed. Heart chambers are segmented in the CT volume, including at least the LV endocardium and the LV epicardium. An optimal threshold value is automatically determined based on voxel intensities within the LV endocardium and voxel intensities between the LV endocardium and the LV epicardium. Voxels within the LV endocardium are labeled as blood pool voxels or papillary muscle voxels based on the optimal threshold value. The LV volume can be measured excluding the papillary muscles based on the number of blood pool voxels, and the LV volume can be measured including the papillary muscles based on the total number of voxels within the LV endocardium.

25 Claims, 8 Drawing Sheets

METHOD AND SYSTEM FOR MEASURING LEFT VENTRICLE VOLUME

This application claims the benefit of U.S. Provisional Application No. 60/974,139, filed Sep. 21, 2007, the disclosure of which is herein incorporated by reference.

BACKGROUND OF THE INVENTION

The present invention relates to medical imaging of the heart, and more particularly, to measuring a volume of the left ventricle of the heart in 3D cardiac CT volumes.

The volume of a heart chamber and its dynamic change over the course of the heart cycle are important parameters in evaluating the functionality of the heart. The dynamic change of the volume of a heart chamber over the course of the heart cycle is typically measured as the ejection fraction (EF) of the heart chamber. Generally, the volume of a chamber at a given time can be determined by measuring the volume of the blood pool contained in the chamber. Typically, the volume of the left ventricle (LV) of the heart is determined in 3D CT volumes either by deformable model based automatic or semi-automatic methods or by thresholding based on voxel intensity using a contrast agent. Due to the complex geometric relationship of the papillary muscles and the blood pool in the LV, deformable model based automatic or semi-automatic methods typically include the papillary muscles in the volume measurement of the LV. In conventional thresholding techniques, if the contrast agent is used appropriately, the blood pool is typically brighter than the papillary muscles, which have similar intensity to the myocardium. Using a carefully tuned threshold, which typically must be tuned manually, the blood pool is separated from the papillary muscles and myocardium. Therefore, conventional thresholding techniques typically exclude the papillary muscles from the volume measurement of the LV.

Since deformable modeling and thresholding approaches are both commonly used in practice, two different LV volume measurements (including and excluding papillary muscles) are commonly used. Cardiologists have not achieved agreement regarding which volume measurement should be used. Accordingly, it is desirable for a method to accurately, efficiently, and automatically measure the LV volume both including the papillary muscles and excluding the papillary muscles.

BRIEF SUMMARY OF THE INVENTION

The present invention provides a method and system for measuring left ventricle (LV) volume both including and excluding papillary muscles in a 3D cardiac CT volume. In order to determine volume measurements of the LV both including and excluding the papillary muscles, embodiments of the present invention perform fully automated heart model fitting based on marginal space learning (MSL) and blood pool voxel labeling using an automatically determined optimal threshold.

In one embodiment of the present invention, a 3D volume, such as a cardiac CT volume is received. The heart chambers, or at least the left ventricle (LV) endocardium and epicardium, are segmented in the 3D volume. The heart chambers can be segmented using MSL, resulting in smooth meshes representing the LV endocardium surface and the LV epicardium surface. The LV volume measurement including the papillary muscles can be determined by calculating the volume enclosed by the LV endocardium surface mesh. An optimal threshold value is then determined based on intensities of voxels within the LV endocardium and voxels between the LV endocardium and the LV epicardium. Each voxel within the LV endocardium is then labeled as a blood pool voxel or a papillary muscle voxel based on the optimal threshold value. The LV volume excluding the papillary muscles is determined based on the number of blood pool voxels.

These and other advantages of the invention will be apparent to those of ordinary skill in the art by reference to the following detailed description and the accompanying drawings.

DETAILED DESCRIPTION

The present invention is directed to a method for measuring left ventricle (LV) volume in 3D medical images, such as computed tomography (CT) volumes, magnetic resonance images (MRI), and ultrasound images. Embodiments of the present invention are described herein to give a visual understanding of the heart modeling method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention measure LV volumes including and excluding the papillary muscles. Such embodiments of the present invention can be implemented by heart segmentation using automatic heart model fitting based on marginal space learning and blood pool voxel labeling using an optimal threshold value automatically determined to minimize labeling error. The voxel labeling can help correct errors in the model fitting, such that the labeled blood pool may improve the accuracy of the heart model fitting. As a by-product of the LV volume measuring, the papillary muscles and myocardium are also extracted, which can be used to study diseases relating to these muscles.

Figure 1:
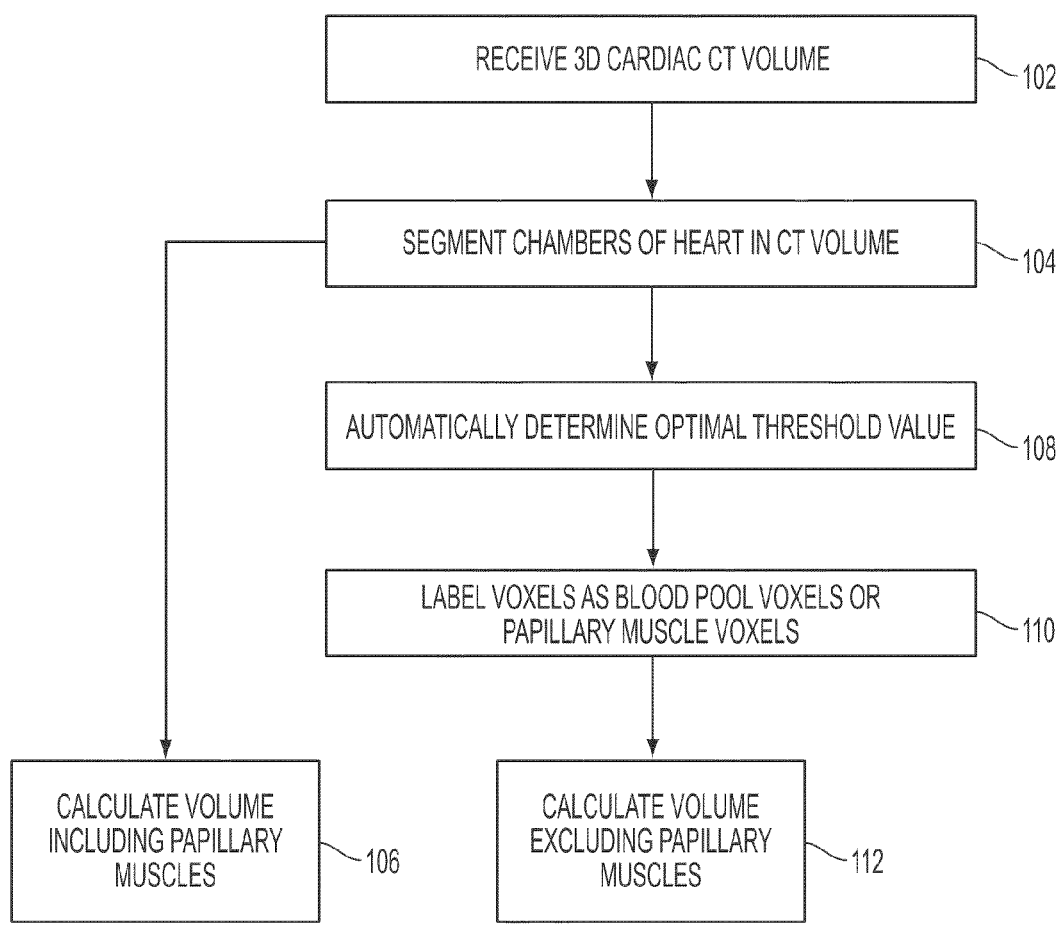
FIG. 1 illustrates a method for measuring left ventricle (LV) volumes both including papillary muscles and excluding papillary muscles in a 3D cardiac computed tomography (CT) volume according to an embodiment of the present invention.

FIG. 1 illustrates a method for measuring LV volumes both including papillary muscles and excluding papillary muscles in a 3D cardiac CT volume according to an embodiment of the present invention. As described herein, the method of FIG. 1 measured LV volumes in 3D cardiac CT volumes, but the present invention is not limited thereto. It is to be understood that the method of FIG. 1 can be similarly applied to other types of 3D cardiac volumes, such as cardiac MRI volumes, and cardiac ultrasound volumes. At step 102, a 3D cardiac CT volume is received. The CT volume can be received from a CT scanning device or can be a previously stored CT volume loaded from memory or storage of a computer system, or some other computer readable medium. The CT volume can be one of a dynamic CT volume sequence. It is to be understood that the method of FIG. 1 can be applied to a dynamic sequence of CT volumes by separately detecting the LV for each CT volume in the CT volume sequence.

At step 104, the chambers of the heart are segmented. The chambers of the heart (LV, right ventricle (RV), left atrium (LA), and right atrium (RA)) can be segmented by generating a model, such as a surface mesh, of the heart chambers using marginal space learning (MSL). Such a model fitting approach can be based on exploiting a large database of annotated CT volumes to learn discriminative object models. This segmentation, or model fitting, can be formulated as a two-step learning problem: anatomical structure localization and boundary delineation. Such a method for MSL-based heart chamber segmentation is described in detail in U.S. Publication No. 2008/0101676, which is incorporated herein by reference.

Object localization is required for automatic segmentation, and discriminative learning approaches are efficient and robust for solving 2D object localization problems. MSL and steerable features are used to extend a learning based approach to 3D object detection. The idea of MSL is not to learn a classifier directly in a full similarity transformation parameter space, but to incrementally learn classifiers on projected sample distributions. As the dimensionality increases, the valid (positive) space region becomes more restricted by previous marginal space classifiers. In order to segment a heart chamber, such as the LV, the estimation of the similarity transformation (i.e., position, orientation, and scale) corresponding to the location of the chamber can be split into three problems: translation estimation, translation-position estimation, and full similarity transformation estimation.

In addition to reducing the size of the search space, another advantage of MSL is that it is possible to use different features or learning methods in each step or marginal space level. For example, in the translation estimation step, since rotation is treated as an intra-class variation, 3D Haar features can be used to train a classifier. In the translation-orientation and full similarity transformation estimation steps, steerable features can be used to train the classifiers. All of the classifiers can be trained as Probabilistic Boosting Trees (PBTs). Steerable features constitute a flexible framework, in which points from the CT volume are sampled under a special pattern. A number of local features, such as voxel intensity and gradient, are determined for each sampling point. To evaluate the steerable features under a particular orientation, the sampling pattern need only to be steered and no volume rotation is involved.

The first stage, or anatomical structure localization using MSL, results in position, orientation, and scale of each chamber. For each chamber, the mean shape of the chamber is then aligned with the estimated transformation to get a rough estimate of the chamber shape. This chamber shape is then deformed to fit the chamber boundary. Active shape models (ASM) are widely used to deform an initial estimate of a non-rigid shape under the guidance of image evidence and shape priori. However, a non-learning based boundary detector ASM may not work properly for boundary delineation of the heart chambers due to complex background and weak edges. Accordingly, a learning based method can be used to exploit more image evidence and achieve robust boundary detection.

Figure 2:
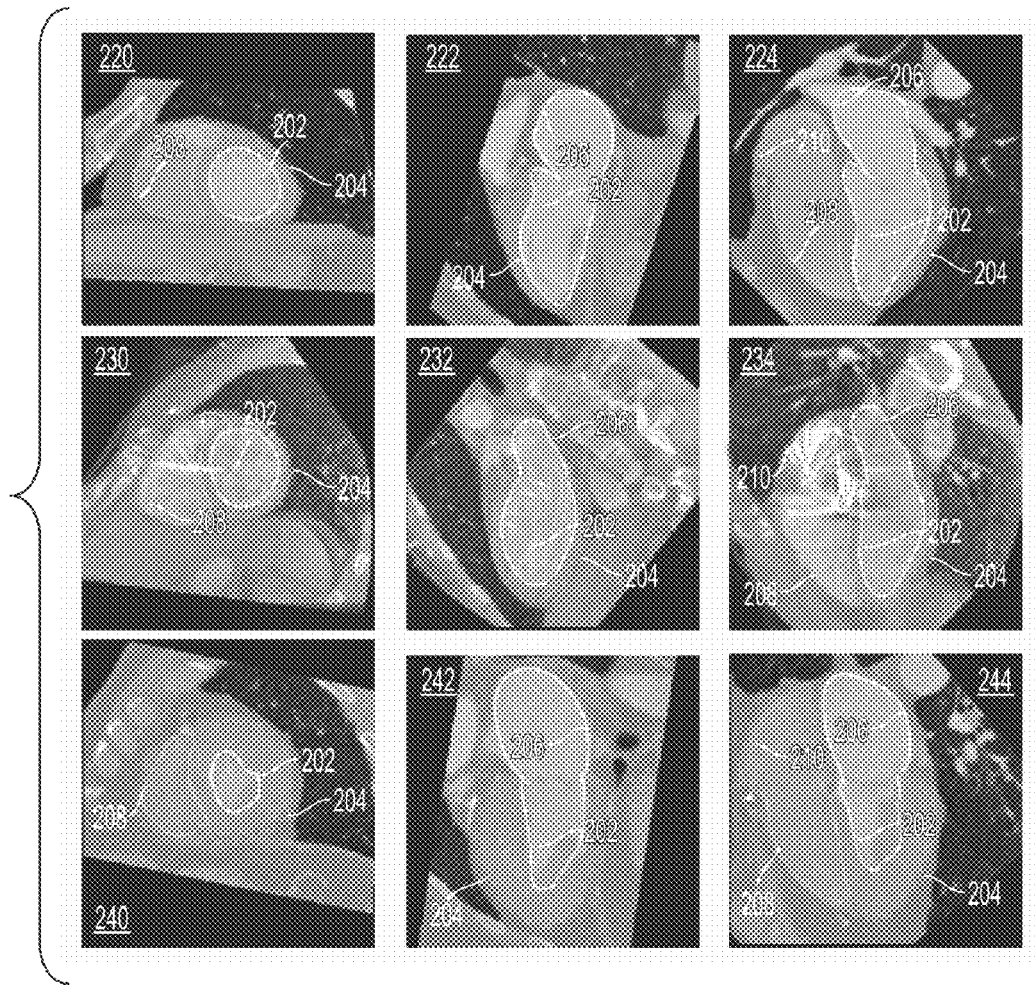
FIG. 2 illustrates exemplary heart chamber segmentation results in slices of 3D CT volumes.

The model resulting from step 104 can be a four-chamber model of the heart. The model at least includes segmentation of the LV including the boundaries of the LV endocardium (inner wall) and the LV epicardium (outer wall). FIG. 2 illustrates exemplary heart chamber segmentation results in slices of 3D CT volumes. As illustrated in FIG. 2, images 220, 222, and 224 are orthogonal slices of a first CT volume, images 230, 232, and 234 are orthogonal slices of a second CT volume, and images 240, 242, and 244 are orthogonal slices of a third CT volume. As shown in images 220-244, the LV endocardium 202, LV epicardium 204, LA 206, RV 208, and RA 210 are segmented in the CT volumes. Surface meshes representing each of the LV endocardium 202, LV epicardium 204, LA 206, RV 208, and RA 210 are generated and appear as contours in the 2D slices 220-244.

Returning to FIG. 1, at step 106, the LV volume including the papillary muscles is determined. The blood pool and the papillary muscles of the LV are both enclosed by the LV endocardium boundary generated by the heart chamber segmentation of step 104. Accordingly, the volume of the LV including the papillary muscles can be determined as the volume enclosed by the LV endocardium boundary. Since each voxel has a known size, the volume enclosed by the LV endocardium boundary can be determined based on the total number of voxels within the segmented LV endocardium. It can be noted that this LV volume calculation can be performed at any time once the heart chambers are segmented. Thus, step 106 is independent of steps 108-112, and need not be performed prior to steps 108-112.

At step 108, an optimal threshold value is automatically determined based on the LV endocardium and LV epicardium segmented at step 104. The four-chamber heart model generated at step 104 uses a smooth surface to delineate the LV endocardium surface, and the papillary muscles are included with the blood pool within the endocardium boundary. In order to measure the LV blood pool volume excluding the papillary muscles, the papillary muscles must be separated from the blood pool. Since the blood pool typically has a higher intensity than the papillary muscles, in particular with the use of a contrast agent, voxel intensity thresholding can be used to extract the blood pool without the papillary muscles. However, due to various scanning protocols and usage of a contrast agent, the intensity contrast between the blood pool and papillary muscles can vary significantly. Accordingly, a predefined threshold may not work well for all CT volumes. In conventional voxel intensity thresholding methods, the threshold value is typically tuned manually. According to an embodiment of the present invention, an optimal threshold value is calculated automatically based on the LV endocardium and LV epicardium segmentation results.

Figure 3:
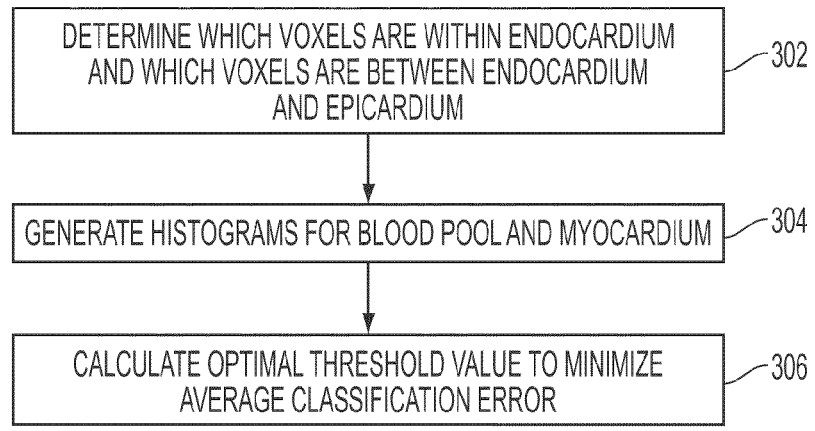
FIG. 3 illustrates a method for automatically calculating an optimal threshold value according to an embodiment of the present invention.

FIG. 3 illustrates a method for automatically calculating the optimal threshold value according to an embodiment of the present invention. Accordingly, the method of FIG. 3 can be utilized to perform step 108 of the method of FIG. 1. Referring to FIG. 3, at step 302, it is determined which voxels are within (or enclosed by) the LV endocardium and which voxels are between the LV endocardium and the LV epicardium. Since both the LV endocardium and LV epicardium surface meshes are open with a hole at the mitral valve, a point can be added to each mesh at the center of the mitral valve and triangles can be added to each mesh to connect the mitral valve center point to the valve rim. This results in closed meshes for the endocardium and the epicardium. In principle, it can be determined if a voxel is enclosed by a closed surface by drawing a line extending from the voxel in an arbitrary direction to infinity. If the line intersects the surface an odd number of times, the voxel is inside the surface. Otherwise, the voxel is outside the surface. However, testing each LV voxel in this manner is time consuming and inefficient. Accordingly, the following more efficient implementation is used by embodiments of the present invention.

For each slice of the CT volume, the intersection of the LV endocardium mesh with the slice is determined. Since the endocardium mesh is closed, the intersection of the mesh with a slice results in a closed 2D contour on the slice. For each slice, the intersection of the 2D contour with each scan line on the slice is determined, resulting in a number of intersection points. For each scan line on a slice the voxels are scanned from left to right and labeled as inside the endocardium or outside the endocardium. Starting at the far left of a scan line, voxels are labeled as outside until a first intersection point is reached. After the first intersection point is reached, all voxels are labeled as inside until a next intersection point is reached. At each intersection point, the labeled is switched, and this process is continued until all voxels on the scan line are labeled. This same process can be repeated using the LV epicardium surface to label voxels as inside or outside of the epicardium. Voxels labeled as inside the endocardium and the epicardium are enclosed within the endocardium and are considered in the blood pool (note that the papillary muscles will be considered as the blood pool). Voxels labeled as outside the endocardium and inside the epicardium are between the endocardium and epicardium and are considered as the myocardium.

Figure 4:
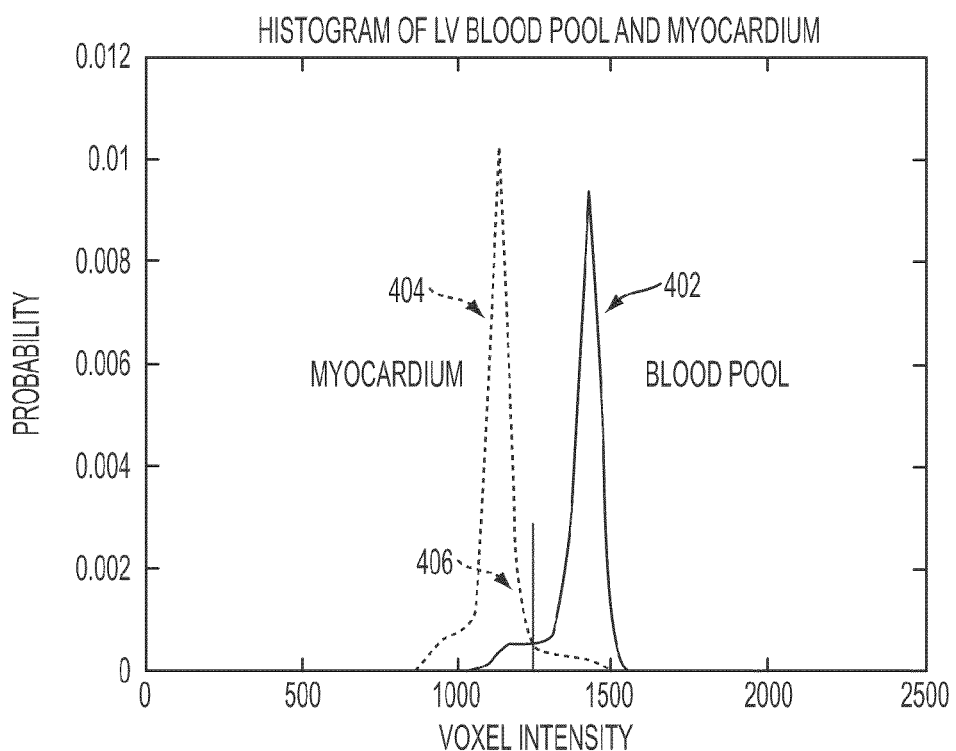
FIG. 4 illustrates exemplary histograms of voxel intensities generated for the blood pool and myocardium of the LV.

At step 304, histograms are generated for the blood pool and the myocardium based on the intensities of the voxels within the endocardium and the voxels between the endocardium and the epicardium, respectively. FIG. 4 illustrates exemplary histograms of voxel intensities generated for the blood pool and myocardium of the LV. As illustrated in FIG. 4, the blood pool histogram 402 and the myocardium histogram 404 are well separated, but slightly overlap in the middle. This is due to the papillary muscles being included in the blood pool histogram 402 and imperfections in endocardium surface segmentation and voxel labeling.

Returning to FIG. 3, at step 306, the optimal threshold value is determined based on the blood pool and myocardium histograms to minimize an average classification error. In other words, the optimal threshold value is determined based on the histograms to be a value that minimizes the number of blood pool voxels whose intensities are less than the value and the number of myocardium voxels whose intensities are greater than the value. As illustrated in FIG. 4, an optimal threshold value 406 is determined based on the blood pool and myocardium histograms 402 and 404. In the example of FIG. 4, the optimal threshold value 406 is determined to be 212.5 HU.

Returning to FIG. 1, at step 110, voxels within the LV endocardium are labeled as blood pool voxels or papillary muscle voxels based on the optimal threshold value. Since the segmentation of the LV endocardium (step 104) may not be perfect, it is possible that a portion of the blood pool may be grouped with the myocardium, which could lead to an inaccurate volume measurement. In order to correct for such minor segmentation errors, the LV endocardium surface mesh can be expanded by moving each point of the mesh outwards a small amount (e.g., 5 mm) along the normal direction. The intensity of each voxel within the expanded LV endocardium is then compared to the optimal threshold value. Voxels with intensities greater than or equal to the optimal threshold value are labeled as blood pool voxels, and voxels with intensities less than the optimal threshold value are labeled as papillary muscle voxels.

Figure 5:
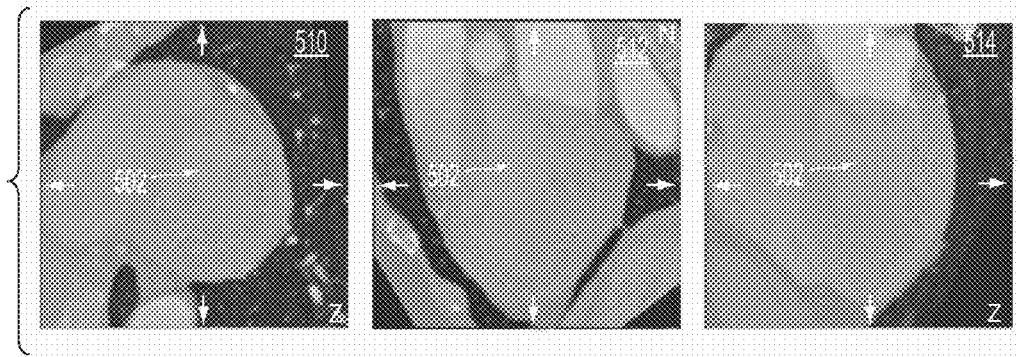
FIG. 5 illustrates exemplary blood pool extraction results.

FIG. 5 illustrates exemplary blood pool extraction results. As illustrated in FIG. 5, images 510, 512, and 514 are orthogonal slices of a CT volume. Shaded region 502 in images 510, 512, and 514 indicates the voxels labeled as blood pool voxels.

Figure 6:
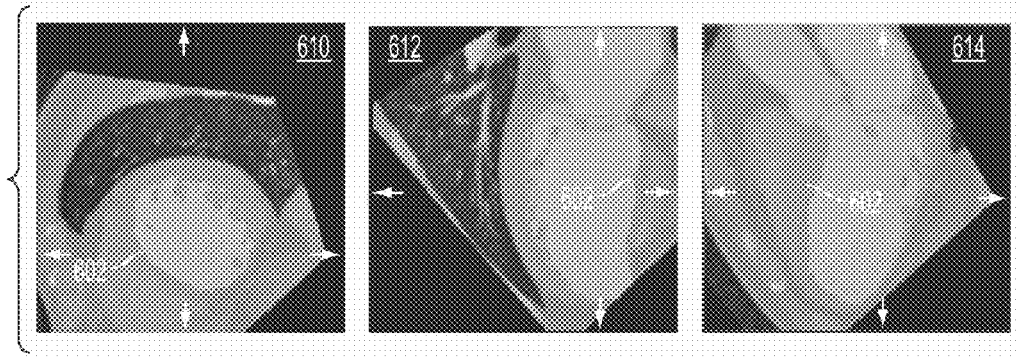
FIG. 6 illustrates a surface mesh representation of exemplary blood pool extraction results.

It is also possible to visualize the extracted blood pool as a surface mesh. For example, the marching cubes algorithm, which is a well-known approach for converting a voxel representation of a 3D object to a surface mesh representation, can be used to convert the voxel representation of the extracted blood pool to a surface mesh. FIG. 6 illustrates a surface mesh representation of exemplary blood pool extraction results. As illustrated in FIG. 6, images 610, 612, and 614 are orthogonal slices of a CT volume. As shown in images 610, 612, and 614, surface mesh 602 represents the extracted blood pool.

Figure 7:
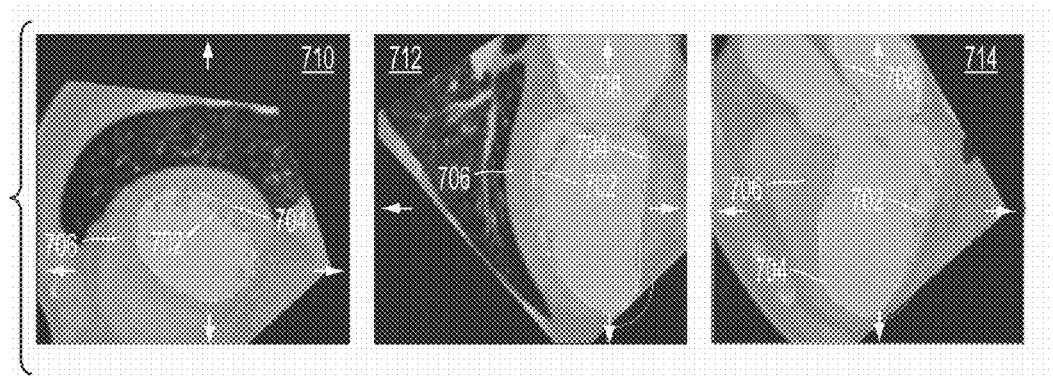
FIG. 7 illustrates exemplary blood pool extraction results overlapped with LV endocardium, LV epicardium, and LA segmentation results.

FIG. 7 illustrates exemplary blood pool extraction results overlapped with LV endocardium, LV epicardium, and LA segmentation results. As illustrated in FIG. 7, images 710, 712, and 714 are orthogonal slices of a CT volume. Images 710, 712, and 714 show the extracted blood pool 702 as a surface mesh, along with the LV endocardium surface mesh 704, the LV epicardium surface mesh 706, and the LA surface mesh 708 resulting from the MSL based heart chamber segmentation.

Returning to FIG. 1, at step 112, the LV volume excluding the papillary muscles is calculated. The LV volume excluding the papillary muscles can be determined by counting the number of blood pool voxels. Since each voxel has a known size, the volume of the blood pool, which is the volume of the LV excluding the papillary muscles, can be easily determined based on the number of blood pool voxels.

As described above, the method of FIG. 1 can be used to measure the LV volume in a 3D CT volume both excluding the papillary muscles (step 112) and including the papillary muscles (step 106). This method can be repeated for each CT volume in a 4D dynamic CT volume sequence in order to determine the LV volumes, both excluding and including papillary muscles, for each CT volume in the sequence. For example, such a 4D dynamic CT volume sequence can capture a full heart cycle. Once the volume measurements are determined for each frame (CT volume) in the sequence, the ejection fraction (EF), which is an important measurement of chamber functionality, is calculated for the dynamic CT volume sequence as follows:

$$EF = \frac{Volume_{ED} - Volume_{ES}}{Volume_{ED}},$$

where $Volume_{ED}$ is the volume of the end-diastolic (ED) phase and $Volume_{ES}$ is the volume of the end-systolic (ES) phase.

Figure 8:
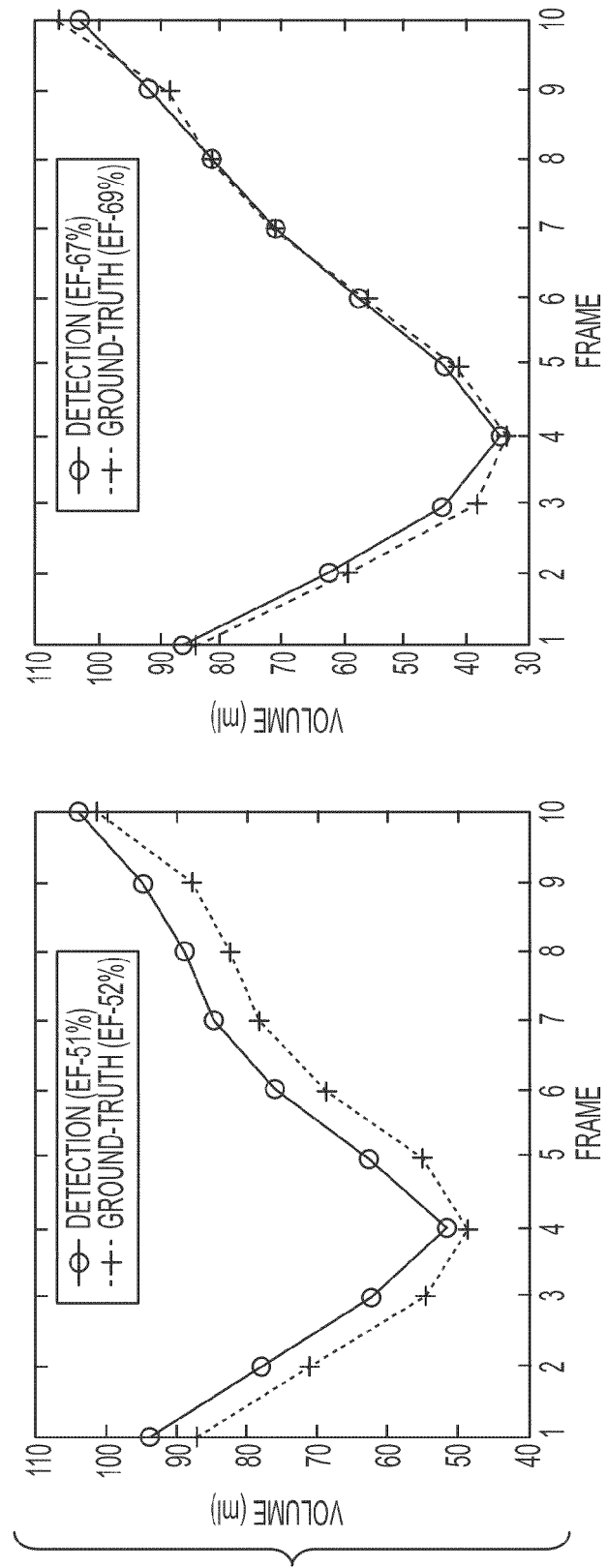
FIG. 8 illustrates LV volume measurements versus time for exemplary CT volume sequences, where volume is measured including papillary muscles.

FIG. 8 illustrates LV volume measurements versus time for exemplary CT volume sequences, where volume is measured including papillary muscles using the method of FIG. 1. As illustrated in FIG. 8, graph 802 shows volume measurements versus time for a first dynamic CT volume sequence, and graph 804 shows volume measurements versus time for a second CT volume sequence. Each graph 802 and 804 also shows actual ground truth values of the LV volumes including the papillary muscles. The EF value determined based on the measured volumes for the first CT volume sequence is 51%, as compared to a ground truth EF value of 52%. The EF value determined based on the measured volumes for the second CT volume sequence is 67%, as compared with the ground truth EF value of 69%.

Figure 9:
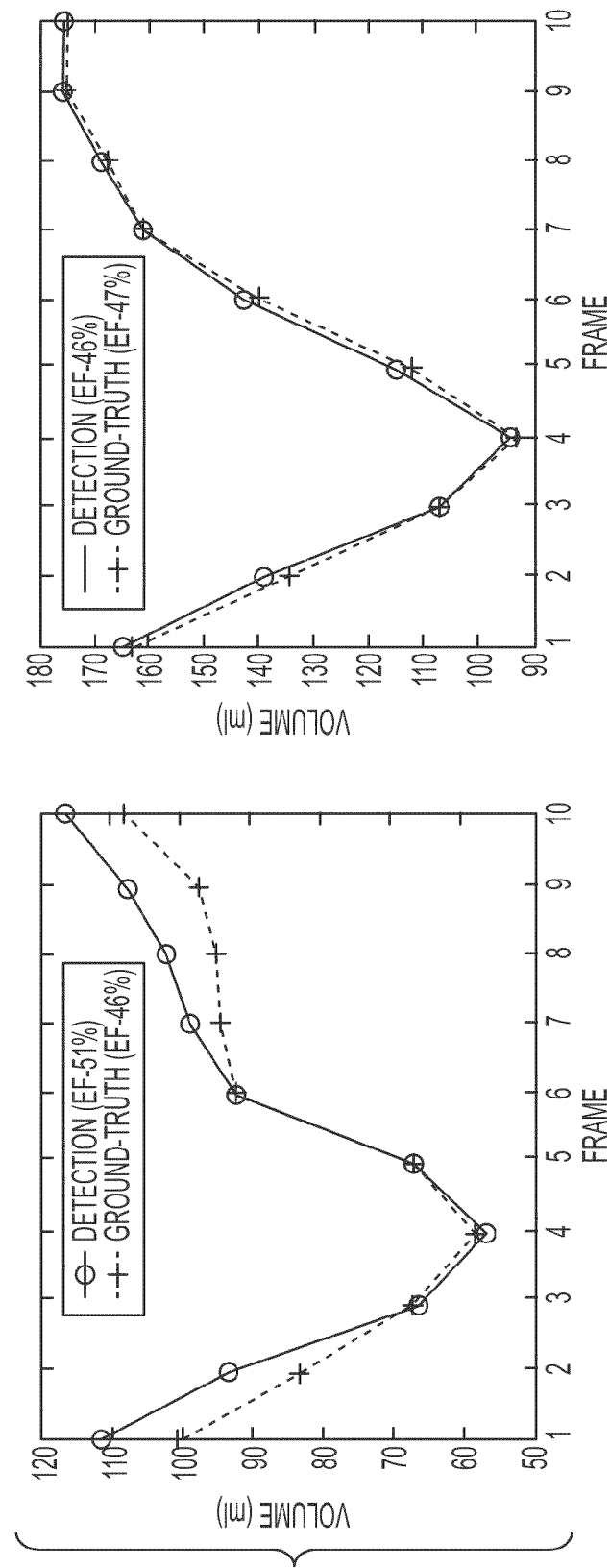
FIG. 9 illustrates LV volume measurements versus time for exemplary CT volume sequences, where volume is measured excluding papillary muscles.

FIG. 9 illustrates LV volume measurements versus time for exemplary CT volume sequences, where volume is measured excluding papillary muscles using the method of FIG. 1. As illustrated in FIG. 9, graph 902 shows volume measurements versus time for a first dynamic CT volume sequence, and graph 904 shows volume measurements versus time for a second CT volume sequence. Each graph 902 and 904 also shows actual ground truth values of the LV volumes excluding the papillary muscles. The EF value determined based on the measured volumes for the first CT volume sequence is 51%, as compared to a ground truth EF value of 46%. The EF value determined based on the measured volumes for the second CT volume sequence is 46%, as compared with the ground truth EF value of 47%.

Figure 10:
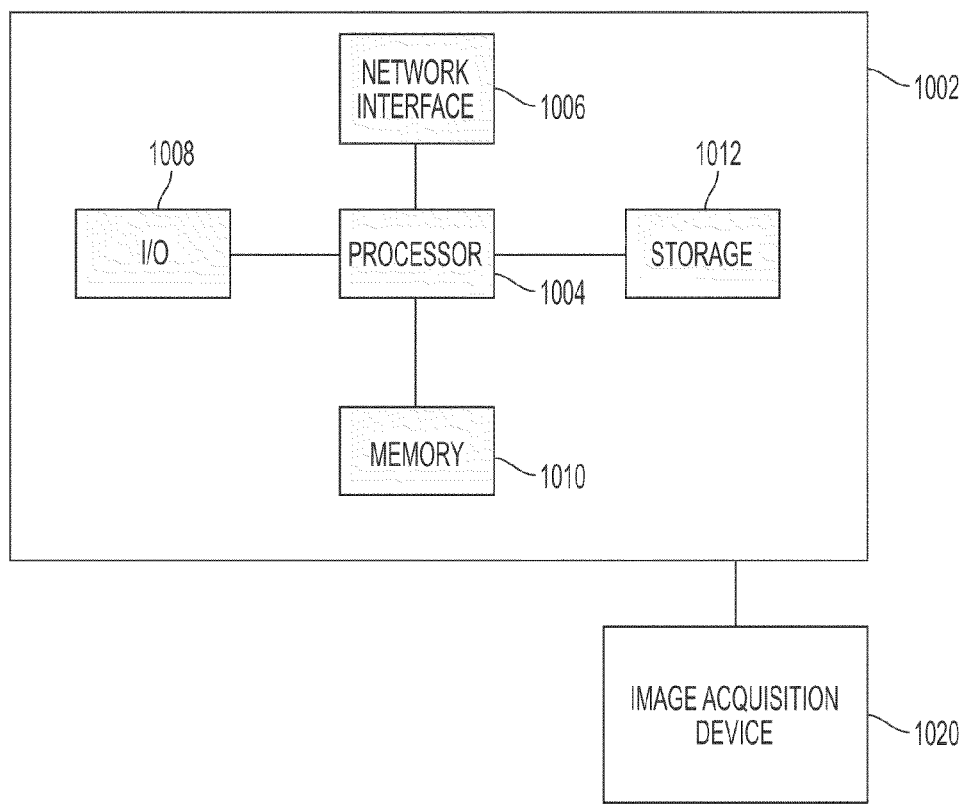
FIG. 10 is a high level block diagram of a computer capable of implementing the present invention.

The above-described methods for measuring LV volume may be implemented on a computer using well-known computer processors, memory units, storage devices, computer software, and other components. A high level block diagram of such a computer is illustrated in FIG. 10. Computer 1002 contains a processor 1004 which controls the overall operation of the computer 1002 by executing computer program instructions which define such operation. The computer program instructions may be stored in a storage device 1012, or other computer readable medium (e.g., magnetic disk, CD ROM, etc.) and loaded into memory 1010 when execution of the computer program instructions is desired. Thus, the steps of the methods of FIGS. 1 and 3 may be defined by the computer program instructions stored in the memory 1010 and/or storage 1012 and controlled by the processor 1004 executing the computer program instructions. An image acquisition device 1020, such as a CT scanning device, can be connected to the computer 1002 to input the 3D volumes to the computer 1002. It is possible to implement the image acquisition device 1020 and the computer 1002 as one device. It is also possible that the image acquisition device 1020 and the computer 1002 communicate wirelessly through a network. The computer 1002 also includes one or more network interfaces 1006 for communicating with other devices via a network. The computer 1002 also includes other input/output devices 1008 that enable user interaction with the computer 1002 (e.g., display, keyboard, mouse, speakers, buttons, etc.). Such input/output devices 1008 may be used in conjunction with a set of computer programs as an annotation tool to annotate volumes received from the image acquisition device 1020. One skilled in the art will recognize that an implementation of an actual computer could contain other components as well, and that FIG. 10 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for measuring left ventricle (LV) volume in a 3D cardiac volume, comprising:
    (a) receiving a 3D cardiac volume;
    (b) segmenting at least an LV endocardium and an LV epicardium in the 3D cardiac volume;
    (c) automatically determining an optimal threshold value based on intensities of voxels within the LV endocardium and voxels between the LV endocardium and the LV epicardium;
    (d) labeling each voxel within the LV endocardium as a blood pool voxel or a papillary muscle voxel based on the optimal threshold value; and
    (e) determining a volume of the LV based on the number of blood pool voxels.

2. The method of claim 1, further comprising:
    (f) determining a volume of the LV including the papillary muscles based on a total number of voxels within the LV endocardium.

3. The method of claim 2, further comprising:
    (g) repeating steps (a)-(f) for each of a plurality of 3D cardiac CT volumes in a dynamic CT volume sequence; and
    (h) calculating an ejection factor for the dynamic CT volume sequence based on at least one of the volumes of the LV determined by step (e) for the 3D cardiac CT volumes and the volumes of the LV determined by step (f) for the 3D cardiac CT volumes.

4. The method of claim 1, wherein step (b) comprises:
    generating surface meshes of the LV endocardium and the LV epicardium using marginal space learning.

5. The method of claim 1, wherein step (b) comprises:
    generating a four-chamber heart model in the 3D cardiac volume using marginal space learning and boundary delineation.

6. The method of claim 1, wherein step (c) comprises:
    determining which voxels in the 3D cardiac volume are within the LV endocardium and which voxels in the 3D cardiac volume are between the LV endocardium and the LV epicardium;
    generating histograms of the intensities of the voxels within the LV endocardium and the intensities of the voxels between the LV endocardium and the LV epicardium; and
    calculating the optimal threshold value based on the histogram to minimize an average classification error.

7. The method of claim 6, wherein the 3D cardiac volume comprises a plurality of slices, step (b) results in meshes representing the LV endocardium and LV epicardium, and said step of determining which voxels in the 3D cardiac volume are within the LV endocardium and which voxels in the 3D cardiac volume are between the LV endocardium and the LV epicardium comprises:
    determining a first 2D contour in each of said plurality of slices defined by an intersection of the LV endocardium mesh with each slice;
    determining intersection points with said first 2D contour with each of a plurality of scan lines in each of said plurality of slices;
    labeling voxels along each scan line as inside or outside of the LV endocardium based on said intersection points;

determining a second 2D contour in each of said plurality of slices defined by an intersection of the LV epicardium mesh with that slice;

determining intersection points with said second 2D contour with each of a plurality of scan lines in each of said plurality of slices; and labeling voxels along each scan line as inside or outside of the LV epicardium based on said intersection points.

8. The method of claim 1, wherein step (d) comprises:

expanding a boundary of the endocardium in the segmented left ventricle;

comparing an intensity of each voxel within the expanded boundary of the endocardium to the optimal threshold value;

labeling each voxel with an intensity greater than or equal to the optimal threshold value as a blood pool voxel; and labeling each voxel with an intensity less than the optimal threshold value as a papillary muscle voxel.

9. The method of claim 1, wherein said 3D cardiac volume is a 3D cardiac computed tomography (CT) volume.

10. An apparatus for measuring left ventricle (LV) volume in a 3D cardiac volume, comprising:

means for receiving a 3D cardiac volume;

means for segmenting at least an LV endocardium and an LV epicardium in the 3D cardiac volume;

means for automatically determining an optimal threshold value based on intensities of voxels within the LV endocardium and voxels between the LV endocardium and the LV epicardium;

means for labeling each voxel within the LV endocardium as a blood pool voxel or a papillary muscle voxel based on the optimal threshold value; and means for determining a volume of the LV based on a number of blood pool voxels.

11. The apparatus of claim 10, further comprising:

means for determining a volume of the LV including the papillary muscles based on a total number of voxels within the LV endocardium.

12. The apparatus of claim 11, wherein said 3D cardiac volume is a 3D cardiac computed tomography (CT) volume.

13. The apparatus of claim 10, wherein said means for segmenting at least an LV endocardium and an LV epicardium in the 3D cardiac volume comprises:

means for generating surface meshes of the LV endocardium and the LV epicardium using marginal space learning.

14. The apparatus of claim 10, wherein said means for segmenting at least an LV endocardium and an LV epicardium in the 3D cardiac volume comprises:

means for generating a four-chamber heart model in the 3D cardiac volume using marginal space learning and boundary delineation.

15. The apparatus of claim 10, wherein said means for automatically determining an optimal threshold value based on intensities of voxels within the LV endocardium and voxels between the LV endocardium and the LV epicardium comprises:

means for determining which voxels in the 3D cardiac volume are within the LV endocardium and which voxels in the 3D cardiac volume are between the LV endocardium and the LV epicardium;

means for generating histograms of the intensities of the voxels within the LV endocardium and the intensities of the voxels between the LV endocardium and the LV epicardium; and means for calculating the optimal threshold value based on the histogram to minimize an average classification error.

16. The apparatus of claim 10, wherein said means for labeling each voxel within the LV endocardium as a blood pool voxel or a papillary muscle voxel based on the optimal threshold value comprises:

means for expanding a boundary of the endocardium in the segmented left ventricle;

means for comparing an intensity of each voxel within the expanded boundary of the endocardium to the optimal threshold value; and means for labeling each voxel with an intensity greater than the optimal threshold value as a blood pool voxel and each voxel with an intensity less than the optimal threshold value as a papillary muscle voxel.

17. A non-transitory computer readable medium encoded with computer executable instructions for measuring left ventricle (LV) volume in 3D cardiac volumes, the computer executable instructions defining steps comprising:

(a) receiving a 3D cardiac volume;

(b) segmenting at least an LV endocardium and an LV epicardium in the 3D cardiac volume;

(c) automatically determining an optimal threshold value based on intensities of voxels within the LV endocardium and voxels between the LV endocardium and the LV epicardium;

(d) labeling each voxel within the LV endocardium as a blood pool voxel or a papillary muscle voxel based on the optimal threshold value; and (e) determining a volume of the LV based on a number of blood pool voxels.

18. The non-transitory computer readable medium of claim 17, further comprising computer executable instructions defining the step of:

(f) determining a volume of the LV including the papillary muscles based on a total number of voxels within the LV endocardium.

19. The non-transitory computer readable medium of claim 18, further comprising computer executable instructions defining the steps of:

(g) repeating steps (a)-(f) for each of a plurality of 3D cardiac CT volumes in a dynamic CT volume sequence; and (h) calculating an ejection factor for the dynamic CT volume sequence based on at least one of the volumes of the LV determined by step (e) for the 3D cardiac CT volumes and the volumes of the LV determined by step (f) for the 3D cardiac CT volumes.

20. The non-transitory computer readable medium of claim 17, wherein the computer executable instructions defining step (b) comprise computer executable instructions defining the step of:

generating surface meshes of the LV endocardium and the LV epicardium using marginal space learning.

21. The non-transitory computer readable medium of claim 17, wherein the computer executable instructions defining step (b) comprise computer executable instructions defining the step of:

generating a four-chamber heart model in the 3D cardiac volume using marginal space learning and boundary delineation.

22. The non-transitory computer readable medium of claim 17, wherein the computer executable instructions defining step (c) comprise computer executable instructions defining the steps of:

determining which voxels in the 3D cardiac volume are within the LV endocardium and which voxels in the 3D cardiac volume are between the LV endocardium and the LV epicardium;

generating histograms of the intensities of the voxels within the LV endocardium and the intensities of the voxels between the LV endocardium and the LV epicardium; and calculating the optimal threshold value based on the histogram to minimize an average classification error.

23. The non-transitory computer readable medium of claim 22, wherein the 3D cardiac volume comprises a plurality of slices, step (b) results in meshes representing the LV endocardium and LV epicardium, and the computer executable instructions defining the step of determining which voxels in the 3D cardiac volume are within the LV endocardium and which voxels in the 3D cardiac volume are between the LV endocardium and the LV epicardium comprise computer executable instructions defining the steps of:

determining a first 2D contour in each of said plurality of slices defined by an intersection of the LV endocardium mesh with each slice;

determining intersection points with said first 2D contour with each of a plurality of scan lines in each of said plurality of slices;

labeling voxels along each scan line as inside or outside of the LV endocardium based on said intersection points;

determining a second 2D contour in each of said plurality of slices defined by an intersection of the LV epicardium mesh with that slice;

determining intersection points with said second 2D contour with each of a plurality of scan lines in each of said plurality of slices; and labeling voxels along each scan line as inside or outside of the LV epicardium based on said intersection points.

24. The non-transitory computer readable medium of claim 17, wherein the computer executable instructions defining step (d) comprise computer executable instructions defining the steps of:

expanding a boundary of the endocardium in the segmented left ventricle;

comparing an intensity of each voxel within the expanded boundary of the endocardium to the optimal threshold value;

labeling each voxel with an intensity greater than the optimal threshold value as a blood pool voxel; and labeling each voxel with an intensity less than the optimal threshold value as a papillary muscle voxel.

25. The non-transitory computer readable medium of claim 17, wherein the 3D cardiac volume is a 3D cardiac computed tomography (CT) volume.

* * * * *